(12) United States Patent
Sutanto et al.

(10) Patent No.: US 7,752,555 B2
(45) Date of Patent: Jul. 6, 2010

(54) CONTROLLING MULTIPLE MAP APPLICATION OPERATIONS WITH A SINGLE GESTURE

(75) Inventors: Herry Sutanto, Redmond, WA (US);
Richard L. Spencer, Seattle, WA (US);
Todd M. Landstad, Redmond, WA (US); Subha Bhattacharyay, Bellevue, WA (US); Haiyong Wang, Redmond, WA (US); F. David Jones, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 11/700,416

(22) Filed: Jan. 31, 2007

(65) Prior Publication Data

US 2008/0184173 A1      Jul. 31, 2008

(51) Int. Cl.
*G06F 15/00* (2006.01)
*G06F 13/00* (2006.01)

(52) U.S. Cl. .................................. 715/760; 715/700
(58) Field of Classification Search .............. 715/700, 715/760, 851–853, 854–855, 740, 761–765
See application file for complete search history.

(56) References Cited

U.S. PATENT DOCUMENTS

| | | | |
|---|---|---|---|
| 5,148,522 A | 9/1992 | Okazaki | |
| 5,579,037 A | 11/1996 | Tahara et al. | |
| 6,321,158 B1 | 11/2001 | DeLorme et al. | |
| 6,938,222 B2 | 8/2005 | Hullender et al. | |
| 7,089,507 B2 | 8/2006 | Lection et al. | |
| 7,142,205 B2 | 11/2006 | Chithambaram et al. | |
| 2003/0093419 A1* | 5/2003 | Bangalore et al. | 707/3 |
| 2005/0005241 A1 | 1/2005 | Hunleth et al. | |
| 2005/0195154 A1 | 9/2005 | Robbins et al. | |
| 2005/0212760 A1* | 9/2005 | Marvit et al. | 345/156 |
| 2006/0026521 A1 | 2/2006 | Hotelling et al. | |

OTHER PUBLICATIONS

Chuck Frey, "MindManager 2002 for Tablet PC Helps Knowledge Workers Operate at New Levels of Productivity", Date: May 15, 2003, http://www.innovationtools.com/Tools/SoftwareDetails.asp?a=89.

Tony Northrup, "Navigate with Tablet PC and Microsoft Streets & Trips 2005 with GPS Locator", Date: Apr. 6, 2005, http://www.microsoft.com/windowsxp/using/tabletpc/learnmore/northrup_navigate.mspx.

* cited by examiner

Primary Examiner—Cao "Kevin" Nguyen

(57) ABSTRACT

A technology for controlling multiple map application operations with a single gesture is disclosed. In one method approach, data describing a single gesture that was inked on a map application output displayed on a device is received. The data is utilized to control multiple operations of the map application.

20 Claims, 8 Drawing Sheets

CONTROLLING MULTIPLE MAP APPLICATION OPERATIONS WITH A SINGLE GESTURE

BACKGROUND

People have used paper maps for thousands of years to determine how to travel from one location to another. In more recent times, people have used paper maps to navigate across and within cities, and to find desired residences or businesses.

With the advent of computers, map applications have been developed which display an electronic map on a display device such as the monitor of a computer. The map application typically includes some type of user interface which allows the user to manipulate operations of the map application. This manipulation of the operations of the map application typically involves using a variety of devices such as a keyboard, a mouse, a touch pad, a stylus, a touch screen, and so on.

Map applications can be employed in various endeavors such as navigation, urban planning, reconnaissance, geographic information systems (GIS), and so on. Map applications enable the user to perform various operations such as, but not limited to zooming in or out of the displayed map, generating or requesting navigational directions, and changing which regions of a map are viewed on the display device (also known as "panning"). Various other operations of the map application are also often user-controllable.

SUMMARY

This Summary is provided to introduce concepts concerning controlling multiple map application operations with a single gesture which are further described below in the Detailed Description. This Summary is not intended to identify key features or essential features of the claimed subject matter, nor is it intended to be used as an aid in determining the scope of the claimed subject matter.

A technology for controlling multiple map application operations with a single gesture is disclosed. In one method approach, data describing a single gesture that was inked on a map application output displayed on a device is received. The data is utilized to control multiple operations of the map application.

In one system approach, "a single gesture for multiple map operations data receiver" is configured for receiving data describing the single gesture that was written on a map displayed on a mobile device. The single gesture enables controlling multiple operations that are determined based on the single gesture. "A single gesture for multiple map operations communicator" is configured for communicating the multiple operations to the map application to enable manipulation of the map based on the multiple operations.

As a result, embodiments of the present technology for controlling multiple map application operations with a single gesture eliminate many of the cumbersome user initiated operations associated with conventional map application control. Additionally, the present technology for controlling multiple map application operations with a single gesture provides an intuitive and user-friendly approach to controlling map application operations.

DESCRIPTION OF THE DRAWINGS

The accompanying drawings, which are incorporated in and form a part of this specification, illustrate embodiments of the technology for controlling multiple map application operations with a single gesture and, together with the description, serve to explain principles discussed below.

Figure 1:
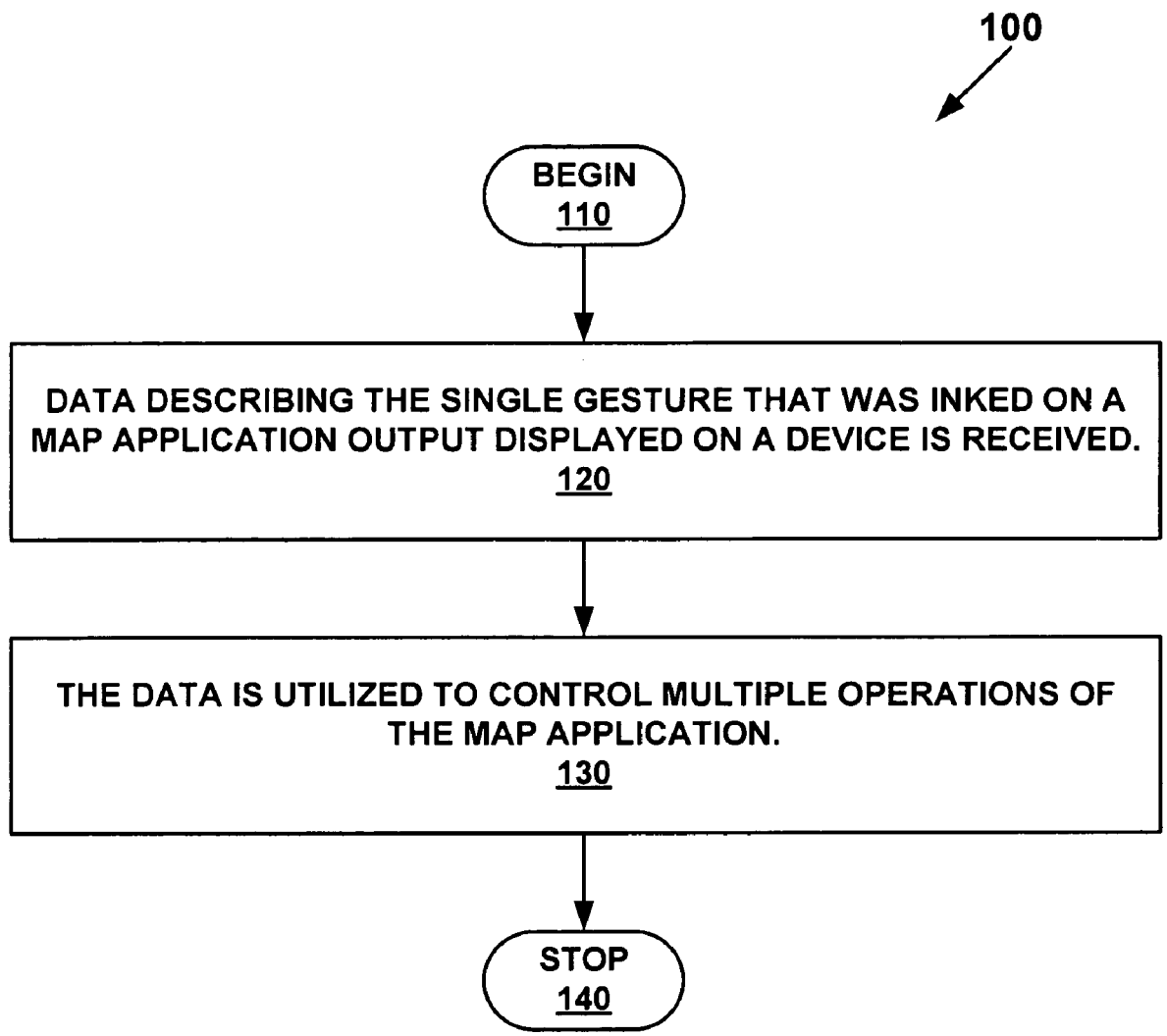
FIG. 1 is a flowchart for a method of controlling multiple map application operations with a single gesture, according to various embodiments.

The drawings referred to in this description should be understood as not being drawn to scale except if specifically noted.

DETAILED DESCRIPTION

Reference will now be made in detail to embodiments of the present technology for controlling multiple map application operations with a single gesture, examples of which are illustrated in the accompanying drawings. While the technology for controlling multiple map application operations with a single gesture will be described in conjunction with various embodiments, it will be understood that they are not intended to limit the present technology for controlling multiple map application operations with a single gesture to these embodiments. On the contrary, the presented technology for controlling multiple map application operations with a single gesture is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for controlling multiple map application operations with a single gesture. However, the present technology for controlling multiple map application operations with a single gesture may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "controlling," "receiving," "utilizing," "determining," "communicating," "using," "navigating," "manipulating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for controlling multiple map application operations with a single gesture is also well suited to the use of other computer systems such as, for example, optical and mechanical computers. Additionally, it should be understood that in embodiments of the present technology for controlling multiple map application operations with a single gesture, one or more of the steps can be performed manually.

Overview

Conventional map applications typically require the use a combination of user interface devices and multiple user interactions with the combination of user interfaces in order to control operations associated with the conventional map applications. For example, conventional map applications require users to type a substantial amount of text in order to obtain directions for driving from one location to another. In another example, conventional map applications require users to perform a multitude of clicking and dragging operations to zoom in or out and to pan appropriately in order to selectively display a location of interest. Typing, clicking, dragging, and so on are examples of user initiated operations.

In contrast, according to one embodiment, the present technology enables a single gesture to be used to control multiple operations of a map application. For example, data describing the single gesture that was inked on a map application output displayed on a device is received and used to control multiple operations of the map application. Therefore, various embodiments eliminate the need for a user to manually perform multiple user initiated operations, as will be described in detail below.

A Method of Controlling Multiple Map Application Operations With A Single Gesture FIG. 1 is a flowchart 100 for a method of controlling multiple map application operations with a single gesture, according to various embodiments. Although specific steps are disclosed in flowchart 100, such steps are exemplary. That is, various embodiments of the present technology are well suited to performing various other steps or variations of the steps recited in flowchart 100. It is appreciated that the steps in flowchart 100 may be performed in an order different than presented, and that not all of the steps in flowchart 100 may be performed. The steps of flowchart 100 will be described briefly below. The present detailed description will describe the steps in more detail in conjunction with FIGS. 2A-6.

At step 110, the method begins.

At step 120, data describing the single gesture that was inked on a map application output displayed on a device is received. For example, the map application output is obtained from a database that is local to the device or that is remote and communicatively coupled to the device. A user may enter a single gesture on map application output that is displayed on a device.

A single gesture, according to one embodiment, is inked on the map application output without requiring a pointing device, such as a stylus or pen, to be lifted. For example, the gesture 210 can be inked on a map application output without a pointing device being lifted. According to another embodiment, a single gesture may be comprised of more than one stroke where the pointing device is lifted between strokes. For example, a single gesture in the form of an "X" includes two strokes where the pointing device is lifted once between the two strokes. The "X" could be used to indicate a destination. A pen can have a magnetic coil that is used to "ink" a gesture on a displayed map. A gesture that is visible after being inked shall be referred to as an "inked gesture."

A data receiver can receive data describing the single gesture. Data describing the single gesture may include the pixel coordinates for one or more pixels that the single gesture was inked on. Data describing a single gesture shall be described in more detail hereinafter.

The received data, according to one embodiment, is analyzed to determine the kind of gesture the data represents. Once the kind of gesture is determined, characteristics of the gesture, as will become more evident, can be determined.

At step 130, the data is utilized to control multiple operations of the map application. For example, conventional map applications require a user to initiate multiple clicking and dragging operations to zoom in and to pan to the center of a map. In contrast, according to one embodiment, the operations of zooming and panning can be controlled with a single zoom gesture, as will become more evident.

At step 140, the method ends.

Figure 2A:
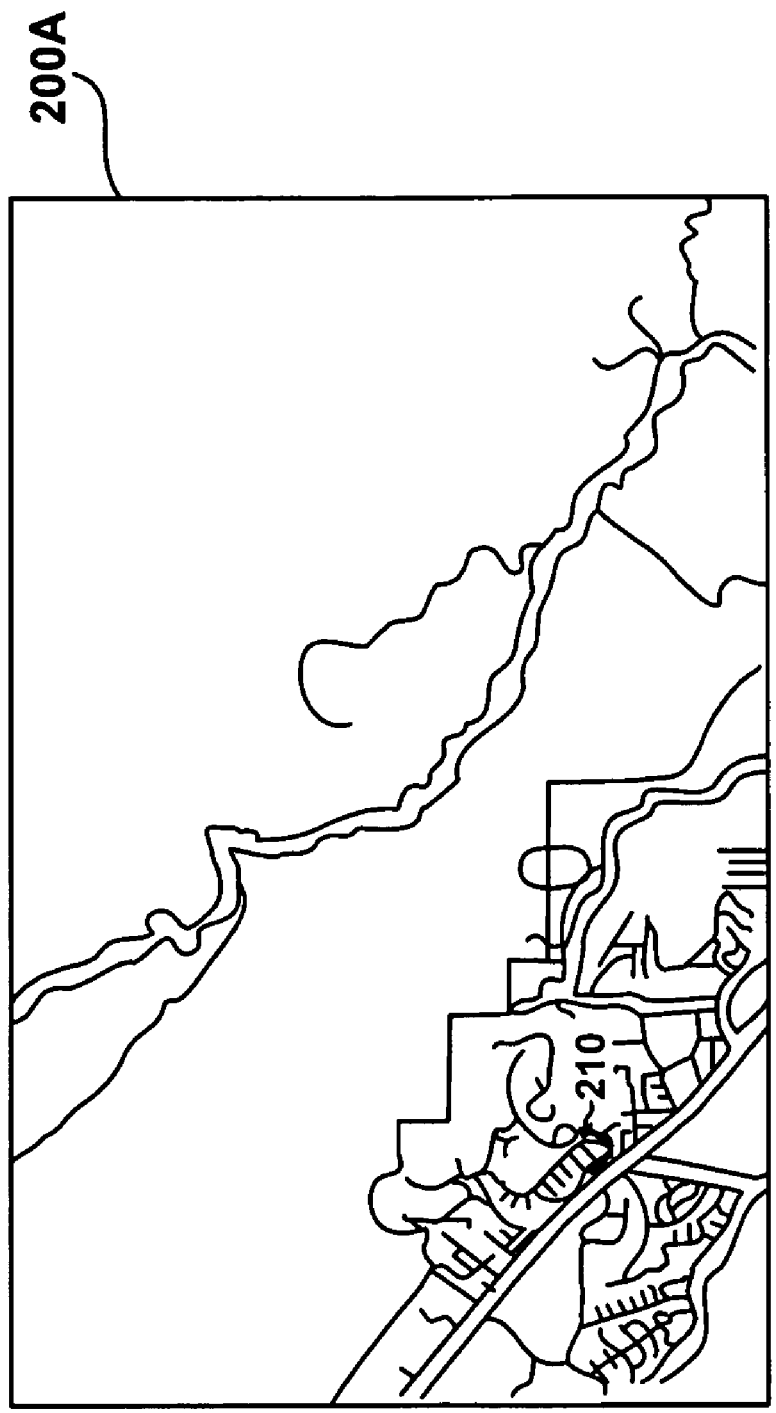
FIG. 2A depicts a single gesture inked on map application output, according to one embodiment.

FIG. 2A depicts a single gesture 210 inked on map application output 200A, according to one embodiment. The single gesture 210 is a "zoom gesture" that is used to zoom in, according to one embodiment. For example, the apex of a zoom gesture 210 designates the center of a map that will result from the zoom operation. The height of a zoom gesture 210 designates the degree of the zoom operation. For example, the larger the zoom gesture 210, the larger the map that results from the zoom operation. The zoom gesture 210 is in the shape of what is commonly known as a "chevron." The pixel coordinates for the apex, the end of the left leg and the end of the right leg is one example of data describing a zoom gesture 210 which is received as described in conjunction with step 120. The orientation of the apex and the height of the zoom gesture 210 are a couple examples of characteristics of the zoom gesture 210 that are determined and utilized as a part of controlling multiple operations of the map application, as will become more evident.

Figure 2B:
FIG. 2B depicts map application output after data describing the single gesture was utilized to control multiple operations of the map application, according to one embodiment.

FIG. 2B depicts map application output 200B after data describing the single gesture 210 was utilized to control multiple operations of the map application, according to one embodiment. For example, a "zoom in" operation has been performed on a region of the displayed map 200A (FIG. 2A) that is in proximity to the zoom gesture 210 resulting in the displayed map 200B.

In FIG. 2A, the zoom gesture 210 is in the lower left hand corner. In contrast, in FIG. 2B the region of the displayed map 200B is centered on the apex of the zoom gesture 210. The amount of zooming, according to one embodiment, was controlled at least in part based on the size of the zoom gesture 210. The height of a zoom gesture 210 controlled the degree of the zoom operation. For example, the larger the zoom gesture 210, the larger the map 200B that results from the zoom operation.

The single zoom gesture 210 is used to control operations for panning and zooming as described in conjunction with step 130. In conventional map applications, multiple user initiated operations of clicking and dragging are required in order to pan to a desired location of a map and zoom a desired degree around the desired location of the map. Further with conventional map applications, the desired location of interest is frequently panned off of the screen as the user alternates between panning and zooming. This forces the user to manually engage in more panning and zooming operations to find the desired location and to zoom on the desired location.

In contrast, a zoom gesture 210 can be used to zoom and to pan to the center of a map, for example designated by the apex of a zoom gesture 210, with a single gesture eliminating the need for a user to manually perform multiple clicking and dragging operations. Therefore, according to one embodiment, the zoom and the pan are examples of two map application operations that can be controlled by a single zoom gesture 210.

The multiple operations are communicated to the map application and the map application uses the multiple operations to manipulate the map, according to one embodiment. Returning to the example, the map application provided another region 200B (FIG. 2B) of a larger map 200A (FIG. 2A) based on information communicated to the map application about the multiple operations, as will become more evident.

The device that displays the map is a desktop, a laptop, or a mobile device, among other things, according to one embodiment. A mobile device, according to one embodiment, is any device that is portable. Examples of mobile devices include but are not limited to hand held personal device (HDPC), palm-held personal computers (PPC or PDA), tablet PCs, and cell phones. A mobile device may not have all of the functionality of a traditional desktop and therefore may be what is commonly known as a "thin client."

Gestures

Figure 3A:
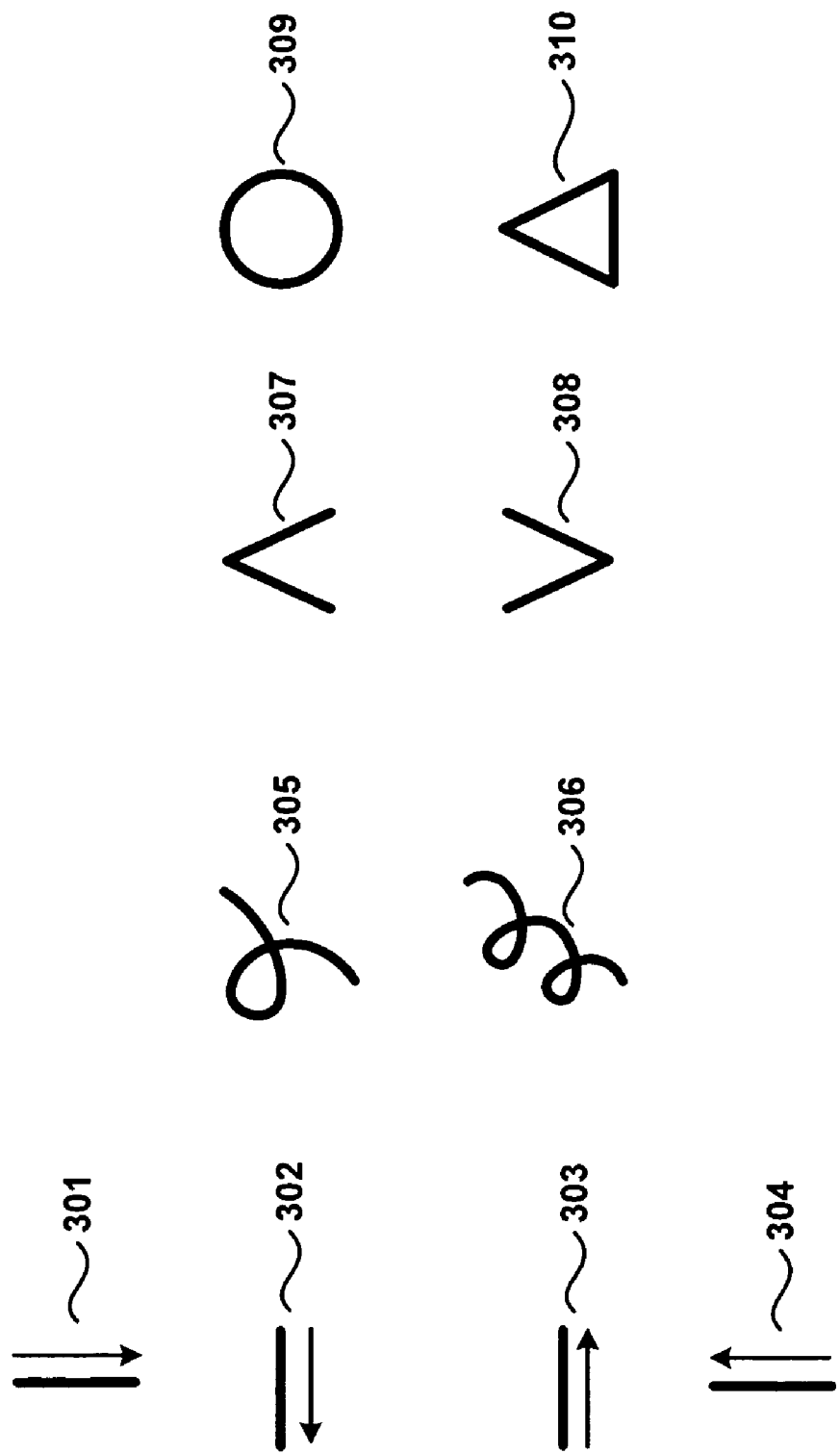
FIGS. 3A and 3B depict other examples of single gestures and a couple of commands, according to various embodiments.
Figure 3B:
Figure 3B:
Figure 3B:
Figure 3B:
Figure 3B:
Figure 3B:

FIGS. 2A and 2B depict one example of a single gesture 210. FIGS. 3A and 3B depict other examples of single gestures and a couple of commands, according to various embodiments. The following is a description of just a few examples of single gestures.

Gestures 301-304 are used to pan across a map, according to various embodiments. The arrows indicate the direction the gestures 301-304 were entered. Gestures 301 and 304 enable panning up or down. Gestures 302 and 303 enable panning left or right. Gestures 301-304 shall also be referred to herein as "panning gestures." The length and direction of a panning gesture are used as a part of determining the amount to pan. For example, the location of the map at the beginning of the panning gesture is moved to the location where the panning gesture ends. Although FIG. 2A depicts pan gestures for up, down, left and right, pan gestures can be entered in other directions. For example, a pan gesture can be used to pan diagonally. According to one embodiment, a panning operation is performed after the panning gesture has been entered.

Gestures 305 and 306 are used to switch map styles, according to one embodiment. Gestures 305 and 306 shall also be referred to as "switch map styles gestures." A couple examples of map styles include but are not limited to a graphical map and a satellite representation of a map. The styles can be stored in an ordered list. If the switch map styles gesture 305 has one loop the style used for displaying the map may be switched to the first style in the ordered list. If the switch map styles gesture 306 has two loops, the style used for displaying the map may be switched to the second style in the ordered list.

Gestures 307 and 308 are zoom gestures that are used to zoom in or out, according to one embodiment. For example, gesture 307 is used to zoom in and gesture 308 is used to zoom out.

Gesture 309 is used to indicate the start point of a route, according to one embodiment. Gesture 309 shall also be referred to as a "start point gesture" or a "start gesture." Gesture 310 is used to indicate the end point of a route, according to one embodiment. Gesture 310 shall also be referred to as an "end point gesture" or an "end gesture." Driving directions between the start and end point can be determined based on a gesture 309 and a gesture 310.

Gesture 311 causes a device to enter a mode that enables a user to associate text with a map (also commonly known as "annotating"), according to one embodiment. Gesture 311 shall also be referred to as a "writing mode gesture." For example, a gesture 311 can be inked by touching a displayed map with a pointing device. When the writing mode is entered, the user can start writing for example using their pointing device. The writing is recognized and translated into text. The entered text may be stored as annotations for the map. In another example, the entered text represents commands, as will become more evident.

Gesture 312 causes one or more commands to be analyzed and executed, according to one embodiment. Gesture 312 shall also be referred to as an "execute command gesture." For example, after a user has entered a start point gesture and an end point gesture, the user may enter an execute command gesture. Driving directions between the start point and the end point represented by the start gesture 309 and the end gesture 310 are generated. In another example, the user may write one or more commands while in "writing mode." The user can enter the execute command gesture resulting in the commands that were previously entered being executed.

Gesture 316 is used to delete previously entered gestures, commands, text and so on, according to various embodiments. Gesture 316 shall also be referred to as a "delete gesture" or a "scratch out gesture." For example, the delete gesture can be used to delete gestures or commands that have been queued up for execution. More specifically, if a start point gesture 309 and an end point gesture 310 were entered but an execute command gesture 312 has not been entered, the delete gesture can be used to delete the start point gesture 309 and the end point gesture 310. In another example, the delete gesture is used to delete annotations. In yet another example, the delete gesture is used to delete displayed driving directions. The delete gesture can be applied to commands, gestures, or text that the delete gesture is entered on top of. The delete gesture can be applied to commands or gestures, among other things, that are queued up but have not yet been executed. These are just a few examples of how the delete gesture can be used.

Gestures 301-312, 315 and 316 are examples of single gestures. According to another embodiment, a command is comprised of free form writing. Commands 313 and 314 are examples of commands comprised of free form writing. Command 313 can be used for finding a place or an address. For example Seattle's space needle is an example of a place. The text "Find Space Needle" can be used to find the space needle. "123 5$^{th}$ Avenue S., Seattle" is an example of text specifying an address. The command "Find 123 5$^{th}$ Avenue S., Seattle" can be used to find the specified address.

Command 314 is used to find a particular type of establishment near a certain location, according to one embodiment. For example "Find Starbucks in 98007" can be used to find the nearest Starbucks™ near or in the zip code 98007. "Find Starbucks here" or just "Find Starbucks" can be used to find the nearest Starbucks™ near or within a displayed map. A place, address, and establishment are examples of locations. Other words can be used instead of "find" for commands 313 and 314. For example "show" or "display" can be used instead of "find." Queries can be performed in order to find the requested location. Commands 313 and 314 can be entered during writing mode, according to one embodiment.

Gesture 315 causes businesses that are near the location where the gesture 315 is entered to be found, according to one embodiment. Gesture 315 shall also be referred to as a "find business gesture". The find business gesture has the shape of a semi-circle, according to one embodiment. For example, a user can enter a semi-circle on a location of the displayed map. A certain number of businesses that are near the location specified by the find business gesture are found. The names of the found businesses can be displayed on the device. The size of the find business gesture is used to determine the number of businesses to locate, according to one embodiment. For example, more businesses are located for a large "find business gesture" than for a small "find business gesture."

The find business gesture 315 can be used to find the next set of businesses a previous set of businesses that resulted from a previously entered find business command such as command 313 or 314. The find business gesture can be created with a left to right motion or a right to left motion. According to one embodiment, the direction the find business gesture 315 is used to determine whether the next set of businesses are to be displayed or whether the previous set of businesses are to be displayed. For example, a find business gesture 315 that is entered from left to right can indicate that the next set of businesses are to be displayed and a find business gesture that is entered from right to left can indicate that the previously displayed set of businesses are to be redisplayed.

Gestures and commands, according to various embodiments, provide a user with information without requiring the user to know a city, a zip code, or an address, among other things. For example, the apex of a zoom gesture, a location in or on the edge of a start or stop gesture, among other things, enable a user to designate locations without knowing a city, a zip code, or an address, among other things.

Data Describing a Single Gesture

Data describing a single gesture that was written on a displayed map is communicated from the device's display to a system for controlling multiple map application operations (also referred to herein as "multiple operations"), according to one embodiment. For example, data describing a single gesture may include the pixel coordinates for one or more pixels that the single gesture was inked on. Data describing a pan gesture may include pixel coordinates for the beginning and the end of the pan gesture. Data describing a zoom gesture may include pixel coordinates for the end of the left leg, pixel coordinates for the end of the right leg, and pixel coordinates for the apex of the zoom gesture.

Multiple Map Application Operations

Multiple map application operations are determined based on data describing a single gesture, according to one embodiment, thus eliminating the need for multiple user initiated operations. For example, conventional map applications require a user to click and scroll or drag, among other things, in order to pan. In contrast, a single pan gesture 301-304, according to one embodiment, controls the multiple operations of clicking, scrolling or dragging thus eliminating the need for the user to click, scroll, drag and so on.

In a second example, a switch map styles 305 or 306 can be used to control multiple map application operations for clicking, scrolling, selecting and so on. For example, conventional map applications require a user to click to display a list of map styles, scroll down to highlight a desired map style and to select the highlighted map style, among other things. In contrast, a switch map styles gesture 305 or 306 eliminates the need for the user to click, scroll, select, and so on.

In a third example, a zoom gesture 307 or 308 can be used to zoom and to pan to the center of a map, for example designated by the apex of a zoom gesture, with a single gesture eliminating the need for a user to perform multiple clicking and dragging operations in order to pan to a desired location of a map and zoom a desired degree around the desired location of the map. According to one embodiment, the zoom and the pan are examples of two map application operations that can be controlled by a zoom gesture.

In order to generate driving directions for conventional map applications, a user clicks on an entry field and enters a substantial amount of text in the entry field designating the starting address. In contrast, the start point gesture 309 enables a user to designate the starting point with a single gesture thus eliminating the user initiated clicking and multitude of key strokes that conventional map applications require. Similar processing is performed with regards to the end point gesture 310

Conventional map applications require various user initiated clicking, scrolling and selecting operations to enter a mode that enables a user to write text. In contrast, the writing mode gesture 311 provides for entering a writing mode with a single gesture.

In order to execute commands, conventional map applications require the user to position the cursor, to select one or more items, to click on an icon such as "GO," and to confirm they want to execute the command(s). In contrast, the execute command gesture 312 provides for executing one or more commands with a single gesture.

In order to find businesses, conventional map applications require various user initiated operations such as clicking, scrolling, entering text designating one or more addresses and a number of desired businesses. Further, conventional map applications require text to be entered in a specific form and/or in a specific location on the map application output. In contrast, the find business gesture 315 provides for finding businesses with a single gesture that can be entered anywhere on the map application output.

Conventional map applications require various user initiated operations such as moving a cursor over entered text or commands and performing a multitude of key strokes to delete the text or commands. In contrast, the delete gesture 316 provides for deleting text or commands with a single gesture.

Multiple map application operations are controlled based on the data that describes a single gesture, according to one embodiment. For example, characteristics of a single gesture are determined based on the data that describes the single gesture. The shape, the size, and the orientation of the single gesture can be determined based on data that describes the single gesture. For example, a line (shape) indicates a pan function. The direction the line was drawn (orientation) indicates whether it is a pan down, pan up, pan left or pan right function. Further, the length (size) of the pan gesture represents an approximate amount of panning to be performed.

Various input variables for a map application are initialized to control the multiple map operations, according to one embodiment. For example, the map application may have multiple input variables, among other things, for function, location, degree and so on. In the case of a zoom in gesture, the function input variable can be set to zoom in. The location input variable can be set to the location where the apex points. The degree input variable can designate for example a percentage to zoom which was determined based on an approximate height of the zoom gesture. In the case of a pan gesture, the function input variable can be set for example to "pan to left", the location input variable may indicate the start and stop point of the pan gesture, and the degree may be based on the length of the pan gesture.

In the case of a start point gesture, the function may be set to determine driving directions. The location input variable may indicate the center of the circle or a point on the edge of the circle for example that is closest to an end point gesture. The degree input variable may be set based on the size of the circle. Similar processing can be performed to determine multiple operations based on an end point gesture. Multiple input variables for the start point gesture may be communicated to a map application at the same time or at a separate time as multiple input variables for an end point gesture. Some of the input variables may be unused in cases where they do not apply. For example the degree input variable may not apply to a writing mode gesture. These are just a few examples of how input variables to a map application can be initialized to control multiple map application operations.

Figure 4:
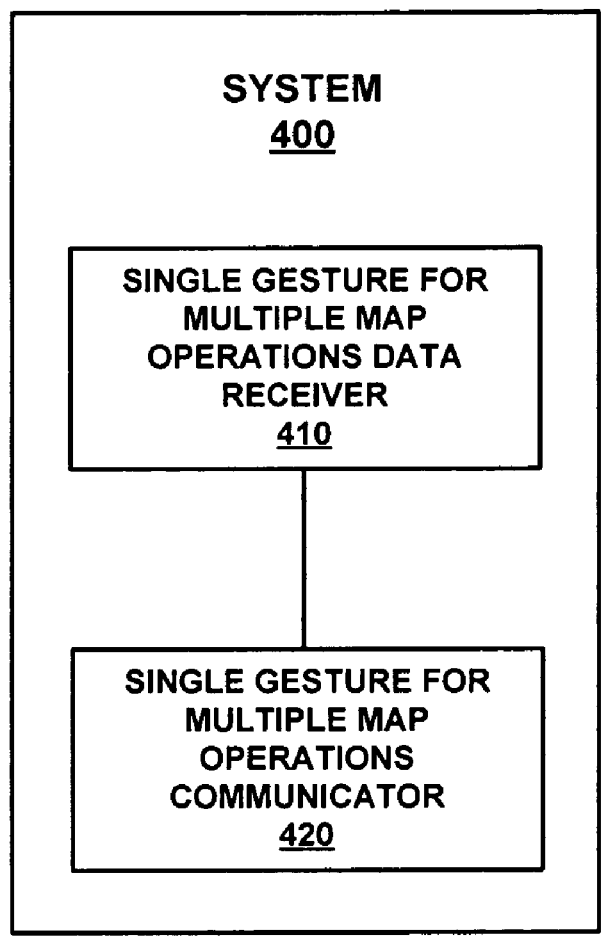
FIG. 4 is a block diagram of a system for controlling multiple map application operations, according to one embodiment.

A System for Controlling Multiple Map Application Operations with a Single Gesture FIG. 4 is a block diagram of a system for controlling multiple map application operations, according to one embodiment. The blocks can represent logic, among other things. The number of pieces of logic represented by the blocks in FIG. 4 may be changed. For example, multiple pieces of logic represented by one block may be separated or pieces of logic represented by two or more blocks may be combined. The blocks may be implemented with hardware, software, firmware or a combination thereof.

The system 400 includes "a single gesture for multiple map operations data receiver 410" (also referred to as a "data receiver") and "a single gesture for multiple map operations communicator 420" (also referred to as a "communicator"). The data receiver 410 is configured for receiving data describing the single gesture that is written on a map displayed on a device. The single gesture enables controlling a map application based on multiple operations that are determined based on the single gesture. The communicator 420 is configured for communicating the multiple operations to the map application to enable manipulating the map based on the multiple operations.

Figure 5:
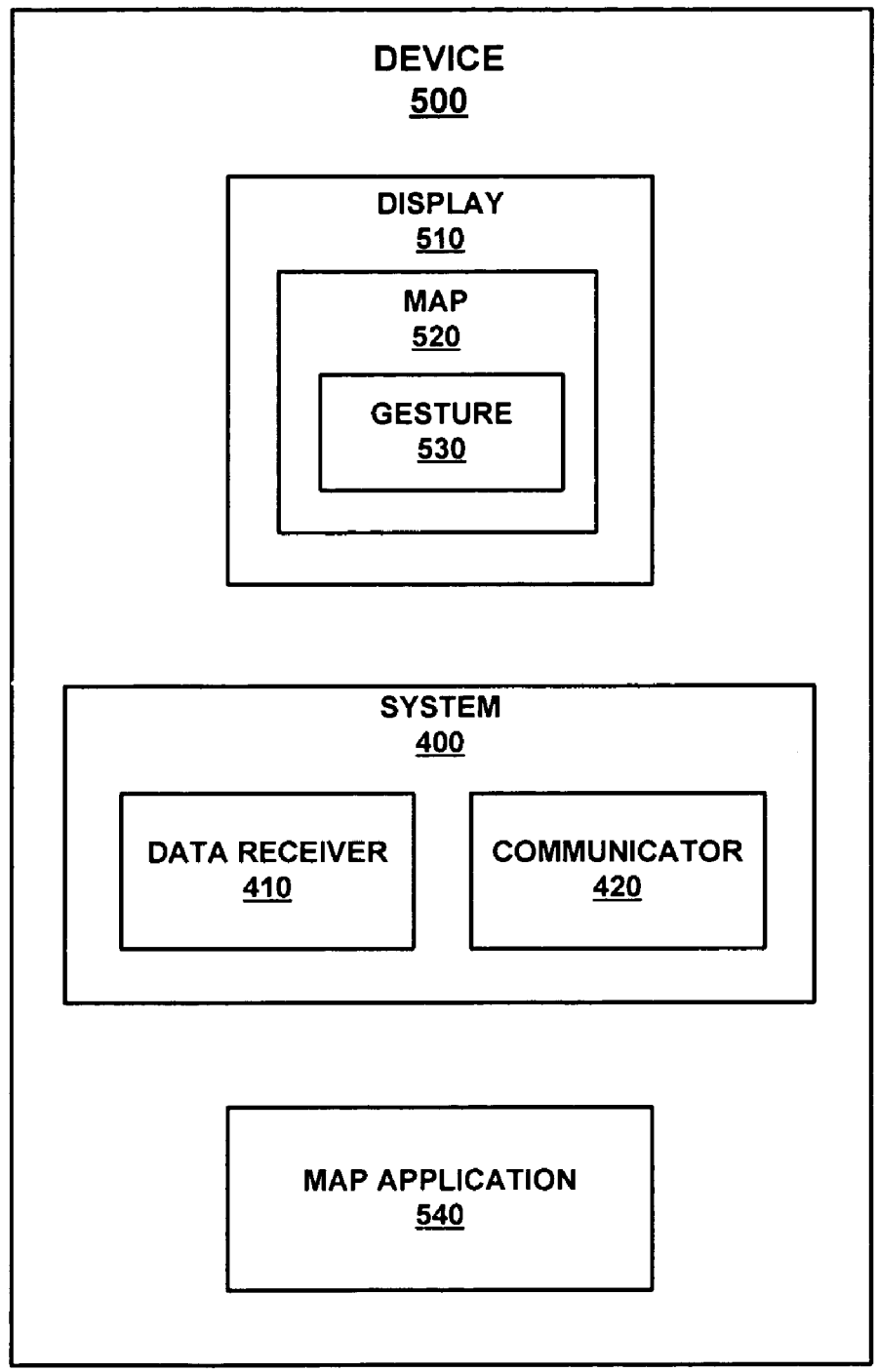
FIG. 5 is a block diagram of a device, according to one embodiment.

The system 400 depicted in FIG. 4 is associated with a device, according to one embodiment. For example the system 400 may be installed on a device. The system 400 may be remote and communicatively coupled to the device. FIG. 5 is a block diagram of a device, according to one embodiment. For example, the device displays map application output 520 that was obtained from a map application 540. A single gesture 530 is inked on the displayed map 520. The data receiver 410 associated with the system 400 receives data describing the single gesture 530. The system 400 uses the data describing the single gesture to control multiple map application operations. The communicator 420 communicates the multiple operations to the map application 540 for example by initializing input variables to the map application 540 based on characteristics of the single gesture.

An Example of a Computer System Environment

Figure 6:
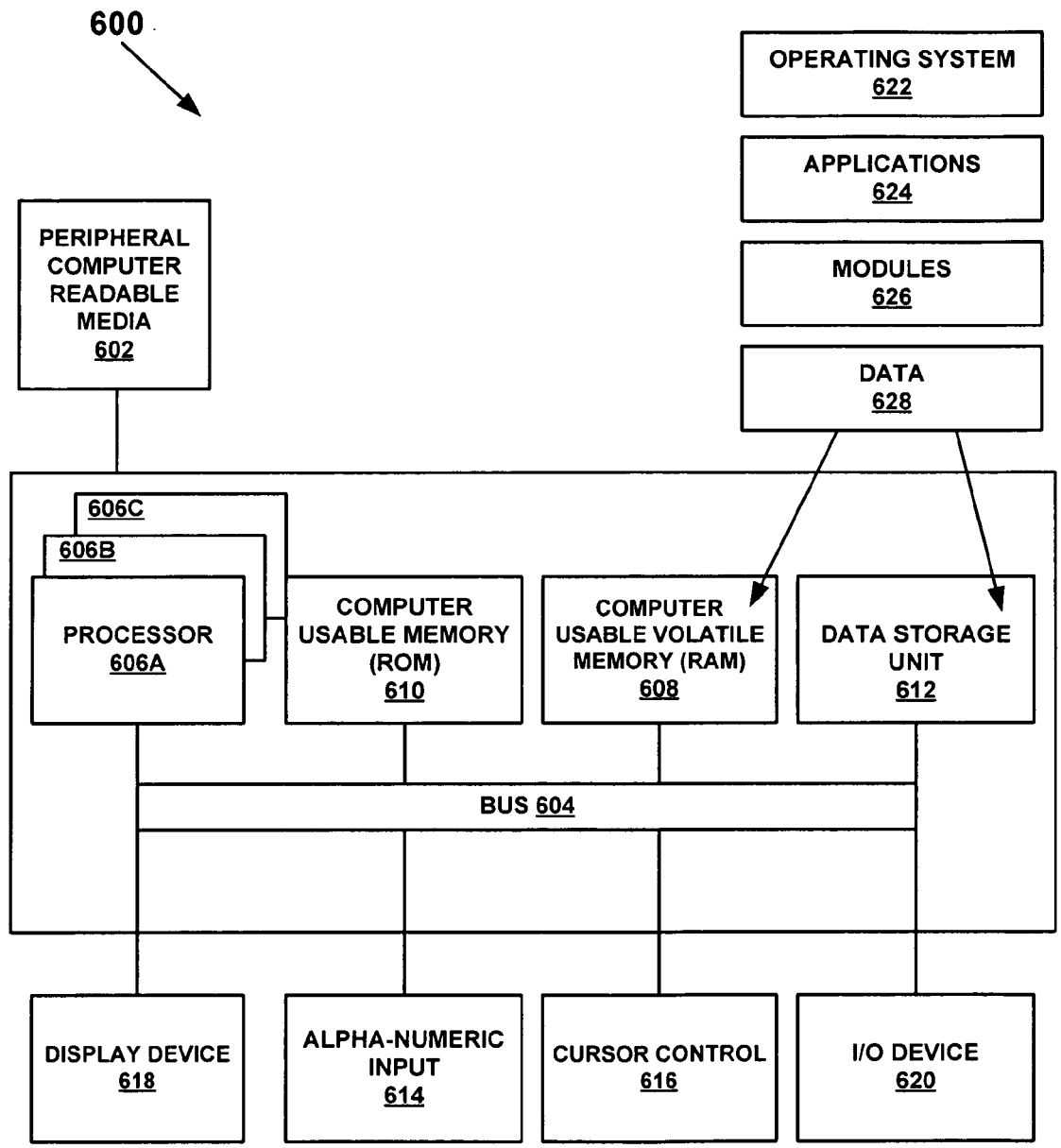
FIG. 6 is a block diagram of an exemplary computer system used in accordance with various embodiments of the present technology for controlling multiple map application operations with a single gesture.

With reference now to FIG. 6, portions of the technology for controlling multiple map application operations with a single gesture are composed of computer-readable and computer-executable instructions that reside, for example, in computer-usable media of a computer system. That is, FIG. 6 illustrates one example of a type of computer that can be used to implement embodiments, which are discussed herein, of the present technology for controlling multiple map application operations with a single gesture. FIG. 6 is a block diagram of an exemplary computer system 600 used in accordance with various embodiments of the present technology for controlling multiple map application operations with a single gesture. It is appreciated that system 600 of FIG. 6 is exemplary only and that the present technology for controlling multiple map application operations with a single gesture can operate on or within a number of different computer systems including general purpose networked computer systems, embedded computer systems, routers, switches, server devices, client devices, various intermediate devices/nodes, stand alone computer systems, and the like. As shown in FIG. 6, computer system 600 of FIG. 6 is well adapted to having peripheral computer readable media 602 such as, for example, a floppy disk, a compact disc, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multiprocessor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM), coupled to bus 604 for storing information and instructions for processors 606A, 606B, and 606C. System 600 also includes computer usable non-volatile memory 610, e.g. read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. System 600 of the present embodiment also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. In one embodiment, the present technology for controlling multiple map application operations with a single gesture, for example, is stored as an application 624 or module 626 in memory locations within RAM 608 and memory areas within data storage unit 612.

The computer-readable and computer-executable instructions reside, for example, in data storage features such as computer usable volatile memory 608, computer usable nonvolatile memory 610, and/or data storage unit 612 of FIG. 6. The computer-readable and computer-executable instructions are used to control or operate in conjunction with, for example, processor 606A and/or processors 606A, 606B, and 606C of FIG. 6. Although specific steps are disclosed in flowchart 100, such steps are exemplary. That is, embodiments are well suited to performing various other steps or variations of the steps recited in flowchart 100. It is appreciated that the steps in flowchart 100 may be performed in an order different than presented, and that not all of the steps in flowchart 100 may be performed.

CONCLUSION

Various embodiments provide an intuitive way of interacting with a map application. For example, zoom gestures provide an intuitive way for a user to specify that they want a zoom operation to be performed because, among other things, the shape of a zoom gesture enables the user to specify the location to center a map on. Further, the shape of a zoom gesture is intuitive to a user. Similarly, other single gestures, such as panning gesture, switch map styles gesture, start and end point gestures, delete gesture, and so on are also intuitive, for example, because of their shape among other things. Various single gestures are also intuitive because they do not require the user to know a significant amount of information. For example, a zoom gesture does not require the user to know a city or a zip code.

Various embodiments provide for controlling multiple operations with a single gesture whereas conventional mapping applications require multiple user initiated operations. For example, in conventional mapping applications a user is required to use a slide bar and use pan operations to position the center of a map that results from a zoom operation. Using the slide bar in conjunction with centering requires a high level of eye to hand coordination. However, according to one embodiment, the user can simply ink a single zoom gesture. The apex of the zoom gesture denotes the center and the size of the zoom gesture can denote the degree of the zoom to be performed, among other things. In another example, using a delete gesture to delete text or previously entered commands among other things is intuitive. In contrast, conventional methods require a user to delete a significant amount of entered text or to perform multiple operations to undo previously entered operations.

The use of input devices, such as a keyboard, a mouse, and so on, is cumbersome to use with a mobile device. Therefore, various embodiments are well suited for mobile devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling, on behalf of a user, a map application executing on a touch-sensitive display of a device having a processor, the method comprising:
executing on the processor instructions configured to:
receive, via the touch-sensitive display, an inked gesture written by the user;
identify a shape of the inked gesture corresponding to a mapping operation;
identify at least one characteristic of the inked gesture, the at least one characteristic corresponding to at least one characteristic of the mapping operation; and
apply to the map application the mapping operation with the at least one characteristic of the mapping operation.

2. The method of claim 1, the inked gesture comprising at least one stroke written by the user on the touch-sensitive display with a pointing device.

3. The method of claim 1, the at least one characteristic of the inked gesture selected from a set of inked gesture characteristics comprising:
a size of the inked gesture;
an orientation of the inked gesture; and
a position of at least a portion of the inked gesture with respect to the touch-sensitive display.

4. The method of claim 1:
the inked gesture written on a map displayed by the map application on the touch-sensitive display; and
at least one characteristic of the inked gesture comprising a position of at least a portion of the inked gesture on the touch-sensitive display corresponding to a position on the map displayed by the map application on the touch-sensitive display.

5. The method of claim 4:
the mapping operation having a start point and an end point; and
the at least one characteristic of the mapping operation comprising:
a first characteristic corresponding to a first position on the map and indicating a starting point of the mapping operation, and
a second characteristic corresponding to a second position on the map and indicating an end point of the mapping operation.

6. The method of claim 1, the mapping operation selected from a set of mapping operations comprising:
a pan map operation associated with a pan shape;
a zoom map operation associated with a zoom shape;
a switch map styles operation associated with a switch map styles shape; and
a find business map operation associated with a find business shape.

7. The method of claim 1:
the mapping operation having received a command, and
the mapping operation selected from a set of mapping operations pertaining to the command, the set of mapping operations comprising:
an execute command operation associated with an execute command shape; and
a delete operation associated with a delete command shape.

8. The method of claim 7, the command comprising text received from the user during a writing gesture mode and translated to identify the command.

9. The method of claim 1, the shape of the inked gesture corresponding intuitively to a mapping operation.

10. The method of claim 1, the instructions configured to, while receiving the inked gesture from the user:
suspend input to the map application, and
present on the touch-sensitive display the shape written on the touch-sensitive display by the user.

11. A system for controlling, on behalf of a user, a map application executing on a touch-sensitive display of a device, the system comprising:
- a single gesture for multiple map operations data receiver configured to:
  - receive, via the touch-sensitive display, an inked gesture written by the user;
  - identify a shape of the inked gesture corresponding to a mapping operation; and
  - identify at least one characteristic of the inked gesture, the at least one characteristic corresponding to at least one characteristic of the mapping operation; and
- a single gesture for multiple map operations communicator configured to apply to the map application the mapping operation with the at least one characteristic of the mapping operation.

12. The system of claim 11, the inked gesture comprising at least one stroke written by the user on the touch-sensitive display with a pointing device.

13. The system of claim 11, the at least one characteristic of the inked gesture selected from a set of inked gesture characteristics comprising:
- a size of the inked gesture;
- an orientation of the inked gesture; and
- a position of at least a portion of the inked gesture with respect to the touch-sensitive display.

14. The system of claim 11:
- the inked gesture written on a map displayed by the map application on the touch-sensitive display; and
- at least one characteristic of the inked gesture comprising a position of at least a portion of the inked gesture on the touch-sensitive display corresponding to a position on the map displayed by the map application on the touch-sensitive display.

15. The system of claim 14:
- the mapping operation having a start point and an end point; and
- the at least one characteristic of the mapping operation comprising:
  - a first characteristic corresponding to a first position on the map and indicating a starting point of the mapping operation, and
  - a second characteristic corresponding to a second position on the map and indicating an end point of the mapping operation.

16. The system of claim 11, the mapping operation selected from a set of mapping operations comprising:
- a pan map operation associated with a pan shape;
- a zoom map operation associated with a zoom shape;
- a switch map styles operation associated with a switch map styles shape; and
- a find business map operation associated with a find business shape.

17. The system of claim 11:
- the mapping operation having received a command, and
- the mapping operation selected from a set of mapping operations pertaining to the command, the set of mapping operations comprising:
  - an execute command operation associated with an execute command shape; and
  - a delete operation associated with a delete command shape.

18. The system of claim 11, the shape of the inked gesture corresponding intuitively to a mapping operation.

19. The system of claim 11, the single gesture for multiple map operations data receiver configured to, while receiving the inked gesture from the user:
- suspend input to the map application, and
- present on the touch-sensitive display the shape written on the touch-sensitive display by the user.

20. A nontransient computer-readable storage medium comprising instructions that, when executed by a processor of a device having a touch-sensitive display, control a map application executing on the device by:
- receiving, via the touch-sensitive display, an inked gesture written by the user;
- identifying a shape of the inked gesture corresponding to a mapping operation;
- identifying at least one characteristic of the inked gesture, the at least one characteristic corresponding to at least one characteristic of the mapping operation; and
- applying to the map application the mapping operation with the at least one characteristic of the mapping operation.

* * * * *